(12) United States Patent
Harai et al.

(10) Patent No.: US 12,128,597 B2
(45) Date of Patent: Oct. 29, 2024

(54) BARREL SUPPORT APPARATUS AND INJECTION APPARATUS

(71) Applicant: TOSHIBA KIKAI KABUSHIKI KAISHA, Tokyo (JP)

(72) Inventors: Haruyoshi Harai, Shizuoka-ken (JP); Masato Kinoshita, Shizuoka-ken (JP)

(73) Assignee: Shibaura Machine Co., Ltd., Tokyo-to (JP)

( * ) Notice: Subject to any disclaimer, the term of this patent is extended or adjusted under 35 U.S.C. 154(b) by 202 days.

(21) Appl. No.: 17/427,427

(22) PCT Filed: Jan. 27, 2020

(86) PCT No.: PCT/JP2020/002784
§ 371 (c)(1),
(2) Date: Jul. 30, 2021

(87) PCT Pub. No.: WO2020/162256
PCT Pub. Date: Aug. 13, 2020

(65) Prior Publication Data
US 2022/0134621 A1    May 5, 2022

(30) Foreign Application Priority Data
Feb. 4, 2019   (JP) .................................. 2019-018136

(51) Int. Cl.
*B29C 45/62*   (2006.01)

(52) U.S. Cl.
CPC .................................... *B29C 45/62* (2013.01)

(58) Field of Classification Search
CPC ...................................................... B29C 45/62
See application file for complete search history.

(56) References Cited

U.S. PATENT DOCUMENTS

| | | | |
|---|---|---|---|
| 5,388,983 A | 2/1995 | Hehl | |
| 2010/0112120 A1* | 5/2010 | Kitta | B29C 45/5008 425/542 |
| 2011/0151048 A1* | 6/2011 | Schad | B29C 45/1773 425/574 |

FOREIGN PATENT DOCUMENTS

| | | |
|---|---|---|
| DE | 19819055 | 7/1999 |
| JP | 5-77289 A | 3/1993 |
| JP | H06-79761 | 3/1994 |
| JP | 6-210662 B2 | 8/1994 |
| JP | 10-329164 A | 12/1998 |
| JP | 2003-136557 A | 5/2003 |
| JP | 2010-111020 | 5/2010 |

OTHER PUBLICATIONS

Machine translation JP2003136557A (Year: 2003).*

(Continued)

*Primary Examiner* — Jacob T Minskey
*Assistant Examiner* — Ayne K. Swier
(74) *Attorney, Agent, or Firm* — DLA Piper LLP (US)

(57) ABSTRACT

There is provided a barrel support apparatus of an injection apparatus which can effectively reduce bending of the barrel due to its own weight. According to one embodiment of the present invention, a barrel support apparatus includes: a barrel support member for supporting a barrel from below; and a leg portion which supports the barrel support member, and can move following the forward and backward movement of the barrel.

10 Claims, 8 Drawing Sheets

(56) References Cited

OTHER PUBLICATIONS

Machine Translation JPH0577289A (Year: 1993).*
German Office Action in DE Application No. 11 2020 000 669.7, dated Dec. 7, 2022.
International Preliminary Report on Patentability in Application PCT/JP2020/002784, dated Aug. 19, 2021.
International Search Report in Application PCT/JP2020/002784, dated Apr. 7, 2020.
Written Opinion in Application PCT/JP2020/002784 dated Apr. 7, 2020.
Chinese Office Action in Application No. 2020800125477, dated Aug. 10, 2022.

* cited by examiner

BARREL SUPPORT APPARATUS AND INJECTION APPARATUS

CROSS REFERENCE TO RELATED APPLICATIONS

This application is a U.S. National Stage Application of International Application No. PCT/JP2020/002784 filed Jan. 27, 2020, which claims priority from Japanese Patent Application No. 2019-018136 filed Apr. 1, 2019. The entirety of all the above-listed applications are incorporated herein by reference.

TECHNICAL FIELD

Embodiments of the present invention relate to a barrel support apparatus and an injection apparatus.

BACKGROUND ART

An injection apparatus of an injection molding machine includes a barrel with a screw inserted therein. A resin material, fed into the barrel, is fed forward by the screw which is rotating while moving backward, and a molten resin is accumulated in front of the screw. Injection of the molten resin is performed by the forward movement of the screw. Such a barrel is cantilever-supported by a body portion of the injection apparatus. A large-sized injection apparatus has a barrel which is quite long and heavy.

Some injection apparatuses, in addition to a mechanism for moving a barrel forward and backward, also have a pivot mechanism for pivoting the entire injection apparatus. A barrel of an injection apparatus needs to be pivoted typically when a screw is pulled out of the barrel to replace the screw with a new one upon maintenance of the injection apparatus. If the barrel is not pivoted, the screw will hit a fixed die plate and cannot be pulled out of the barrel.

Prior-art injection apparatuses having such a pivot mechanism include an injection apparatus described in patent document 1. In this injection apparatus, a frame constituting a body portion of the injection apparatus is configured to pivot on a support pin as a pivot axis.

CITATION LIST

Patent Literature

Patent document 1: Japanese Patent Laid-Open Publication No. 2010-111020

SUMMARY OF THE INVENTION

Problems to be Solved by the Invention

In an injection apparatus, a barrel is configured to move forward when a nozzle is brought into contact with a mold, and to move backward when the nozzle is detached from the mold. The barrel is moved forward and backward while it is cantilever-supported by a body portion of the injection apparatus.

The cantilevered barrel is long and quite heavy especially when the injection apparatus is a large-sized one. The barrel may therefore bend by its own weight. The bend of the barrel will make the barrel eccentric to a screw housed in the barrel, causing a deformation of the screw. Alignment of the barrel and the screw in such an eccentric state requires a very difficult operation.

The present invention has been made in view of the above problems in the prior art. It is therefore an object of the present invention to provide a barrel support apparatus and an injection apparatus which can effectively reduce bending of a barrel due to its own weight.

It is another object of the present invention to provide a barrel support apparatus and an injection apparatus which can easily perform a pivoting operation on a barrel e.g. upon maintenance of a screw and which, after the pivoting operation, can return the barrel to its original position without the need for readjustment of its height.

Means for Solving the Problems

In order to achieve the object, the present invention, in one embodiment, provides a barrel support apparatus for horizontally supporting a barrel of an injection apparatus which can move forward and backward, comprising: a barrel support member for supporting the barrel from below; and a leg portion which supports the barrel support member, and can move following the forward and backward movement of the barrel.

The present invention, in another embodiment, provides an injection apparatus comprising: a barrel; and the above-described barrel support apparatus, wherein the barrel is horizontally supported by the barrel support apparatus.

BEST MODE FOR CARRYING OUT THE INVENTION

Embodiments of the barrel support apparatus and the injection apparatus according to the present invention will now be described with reference to the attached drawings.

First Embodiment

Figure 1:
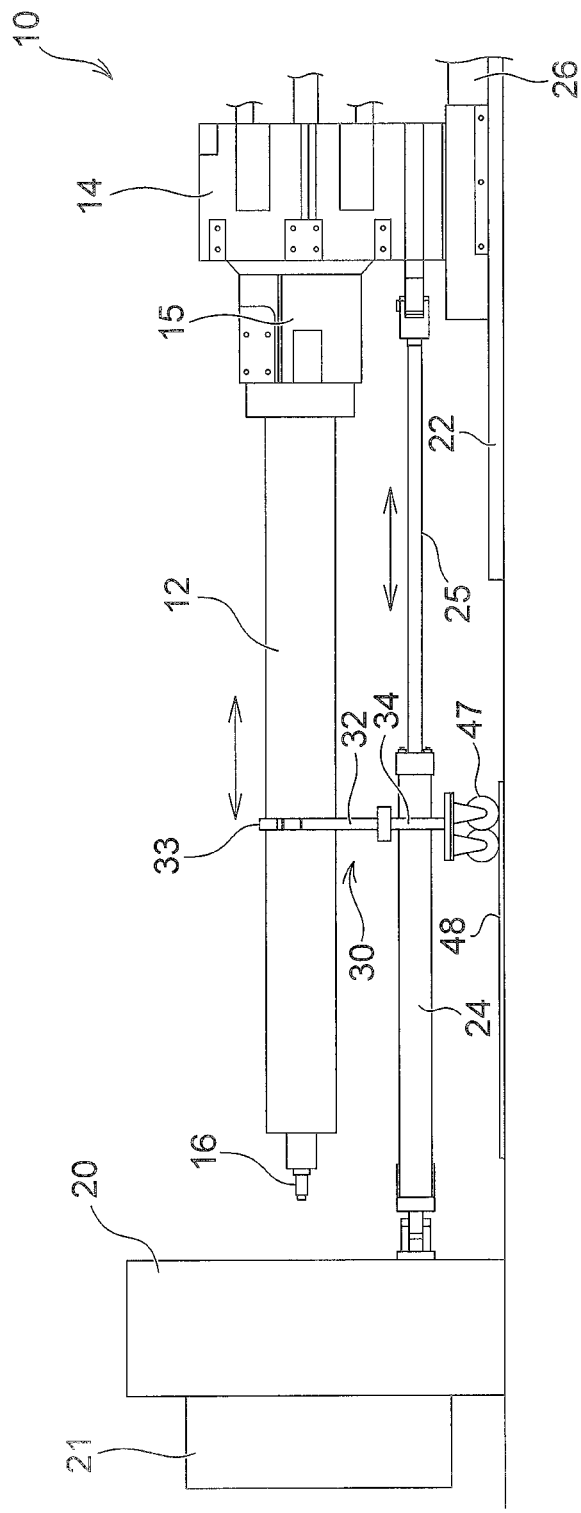
FIG. 1 is a side view of an injection apparatus of an injection molding machine according to a first embodiment of the present invention.

FIG. 1 is a side view of an injection apparatus of an injection molding machine according to a first embodiment of the present invention. In FIG. 1, reference numeral 10 denotes an injection apparatus. 20 denotes a fixed die plate, and 21 denotes a fixed mold. The injection apparatus 10 includes a barrel 12 and an injection bracket 14. The barrel 12 is cantilever-supported in a horizontal position by a barrel mount 15. The injection bracket 14 is provided with a plasticizing motor (not shown) for rotating a screw inserted in the barrel 12, and an injection motor (not shown) for moving the screw forward in the axial direction.

A nozzle 16 is mounted to the front end of the barrel 12. A nozzle touch cylinder 24 is mounted to the fixed die plate 24, and a piston rod 25 of the nozzle touch cylinder 24 is coupled to the injection bracket 14. When the piston rod 25 of the nozzle touch cylinder 24 moves backward, the barrel 12 moves forward and the nozzle 16 is pressed against a sprue bush of the fixed mold 21. When the piston rod 25 extends, the nozzle 16 moves away from the fixed mold 21. 22 denotes a linear guide for guiding the forward and backward movement of the injection apparatus 10. A base 26 of the injection apparatus 10 is configured to slide on the linear guide 22.

In the injection apparatus 10 of this embodiment, the barrel 12 having a long length is cantilever-supported. Accordingly, a bending moment will act on the barrel 12 and the screw housed therein to bend them by their own weight. The barrel 12 is supported by a barrel support apparatus 30 so as to avoid such a bending moment.

Figure 2:
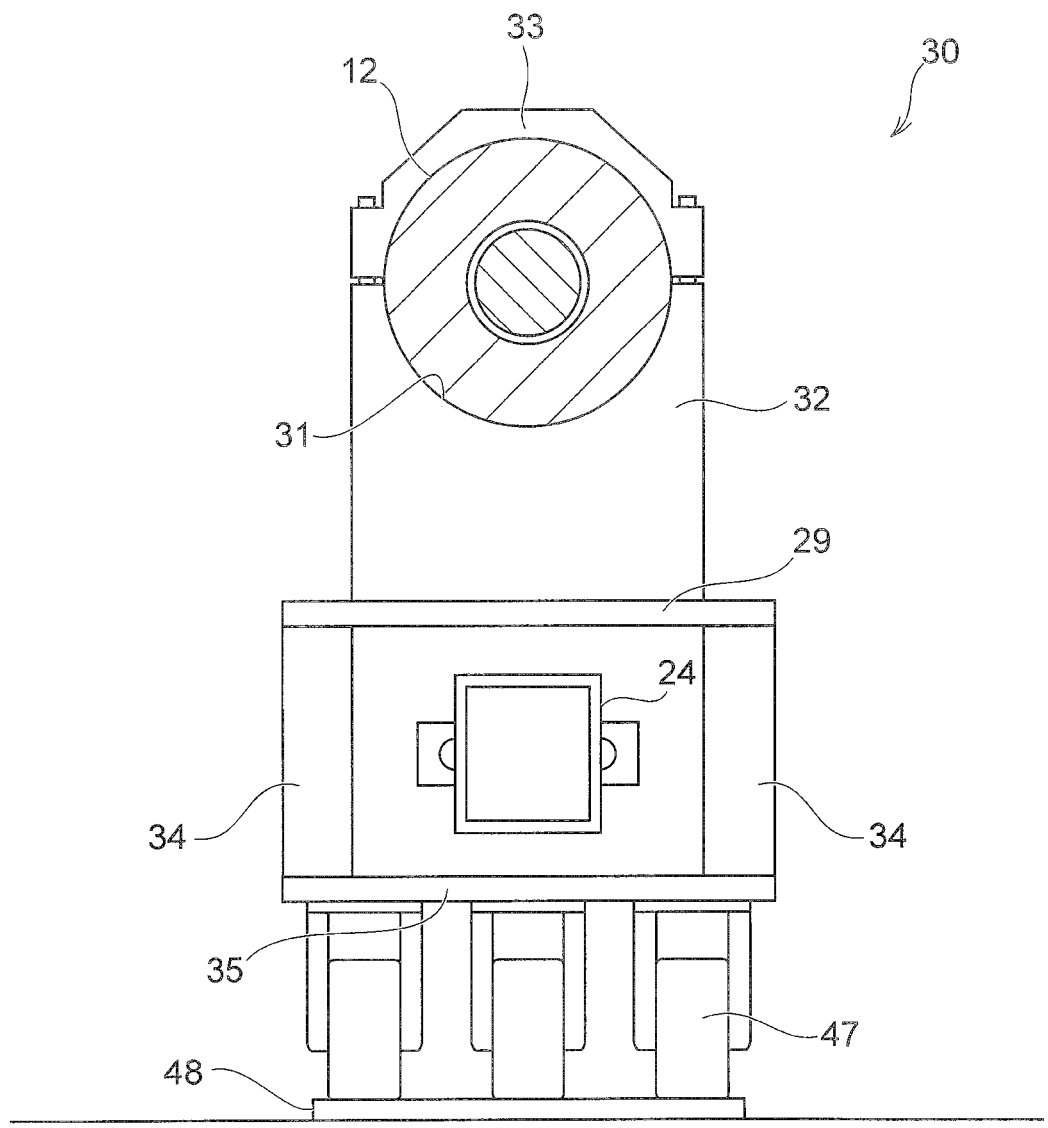
FIG. 2 is a front view of a barrel support apparatus according to the first embodiment.

FIG. 2 is a front view of the barrel support apparatus 30 according to the first embodiment. The barrel support apparatus 30 includes, as main components, a barrel support member 32 for supporting the barrel 12 in a horizontal position from below, and a leg portion 34 for supporting the barrel support member 32.

The barrel support member 32 is a plate-like member having a large semi-circular groove 31 formed in an upper portion. The lower surface of the horizontal barrel 12 detachably fits into the groove 31. A C-shaped clamp member 33 is mounted on the upper half of the barrel 12. The clamp member 33 is secured by bolts to the barrel support member 32. The barrel support member 32 is in a position perpendicular to the axial direction of the barrel 12.

The upper end of the leg portion 34 is secured to a flange portion 29 formed at the bottom of the barrel support member 32. The lower end of the leg portion 34 is secured to a fixed plate 35. Casters 47 are mounted to the lower surface of the fixed plate 35. The casters 47 roll on a traveling platform 48.

The action and effect of the thus-constructed barrel support apparatus 30 according to this embodiment will now be described.

As shown in FIG. 1, the barrel 12 is supported horizontally by the barrel support apparatus 30 during successive injection cycles. With the casters 47 provided in the leg portion 34, the barrel support apparatus 30, supporting the barrel 12, moves forward and backward following the movement of the barrel 12. The barrel 12 is not in fact a perfect rigid body which is hypothetically regarded as being free of any mechanical deformation; thus, it is impossible to completely avoid bending of the barrel 12 due to the action of a bending moment. However, since the barrel 12 is horizontally supported by the barrel support apparatus 30 in this embodiment, the bend of the barrel 12 can be effectively reduced. The barrel support apparatus 30 moves following the movement of the barrel 12, and therefore there is no change in the position of the support point on the barrel 12. Accordingly, there is no change in the state of the barrel 12 which is supported horizontally with reduced bending.

Second Embodiment

A second embodiment of the present invention will now be described with reference to FIGS. 3 through 8. The same reference numerals are used for the same components or elements as those of the first embodiment shown in FIGS. 1 and 2, and a detailed description thereof is omitted.

Figure 3:
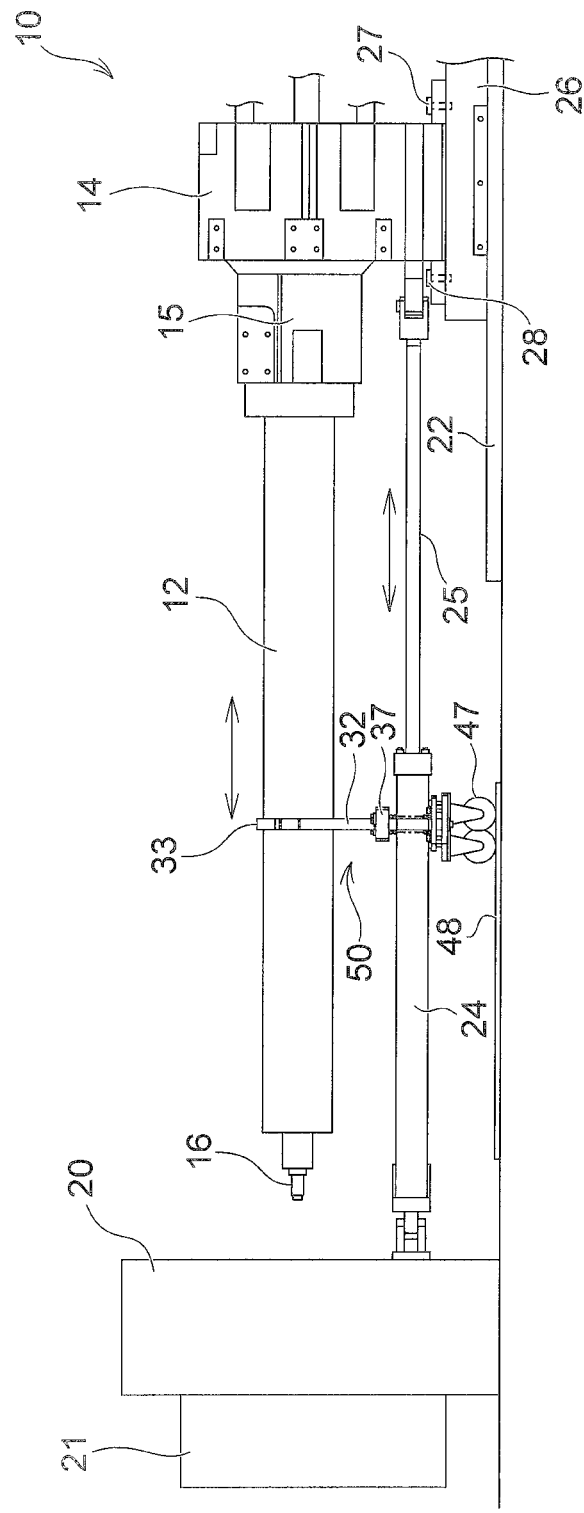
FIG. 3 is a side view of an injection apparatus of an injection molding machine according to a second embodiment of the present invention.

FIG. 3 is a side view of an injection apparatus of an injection molding machine according to a second embodiment of the present invention.

In the second embodiment, the entire injection apparatus 10, besides the forward and backward movement, can pivot on a pivot axis. The injection bracket 14 and the base 26 are coupled by a pivot pin 27. The injection bracket 14 is usually secured by fixing bolts 28 to the base 26. The injection apparatus 10 moves forward and backward when the injection bracket 14 is in such a fixed state. When the fixing bolts 28 are removed at the backward limit position, and the piston rod 25 is extended, the injection bracket 14 pivots on the pivot pin 27. When the injection bracket 14 is pivoting, it is driven by a not-shown pivot cylinder.

Compared to a small-sized injection apparatus, the injection apparatus 10 of this embodiment has the long cantilevered barrel 12, and therefore a bending moment will act on the barrel 12 and on the screw housed therein due to their own weight. The barrel 12 is supported by a barrel support apparatus 50 according to the second embodiment so as to avoid such a bending moment.

Figure 4:
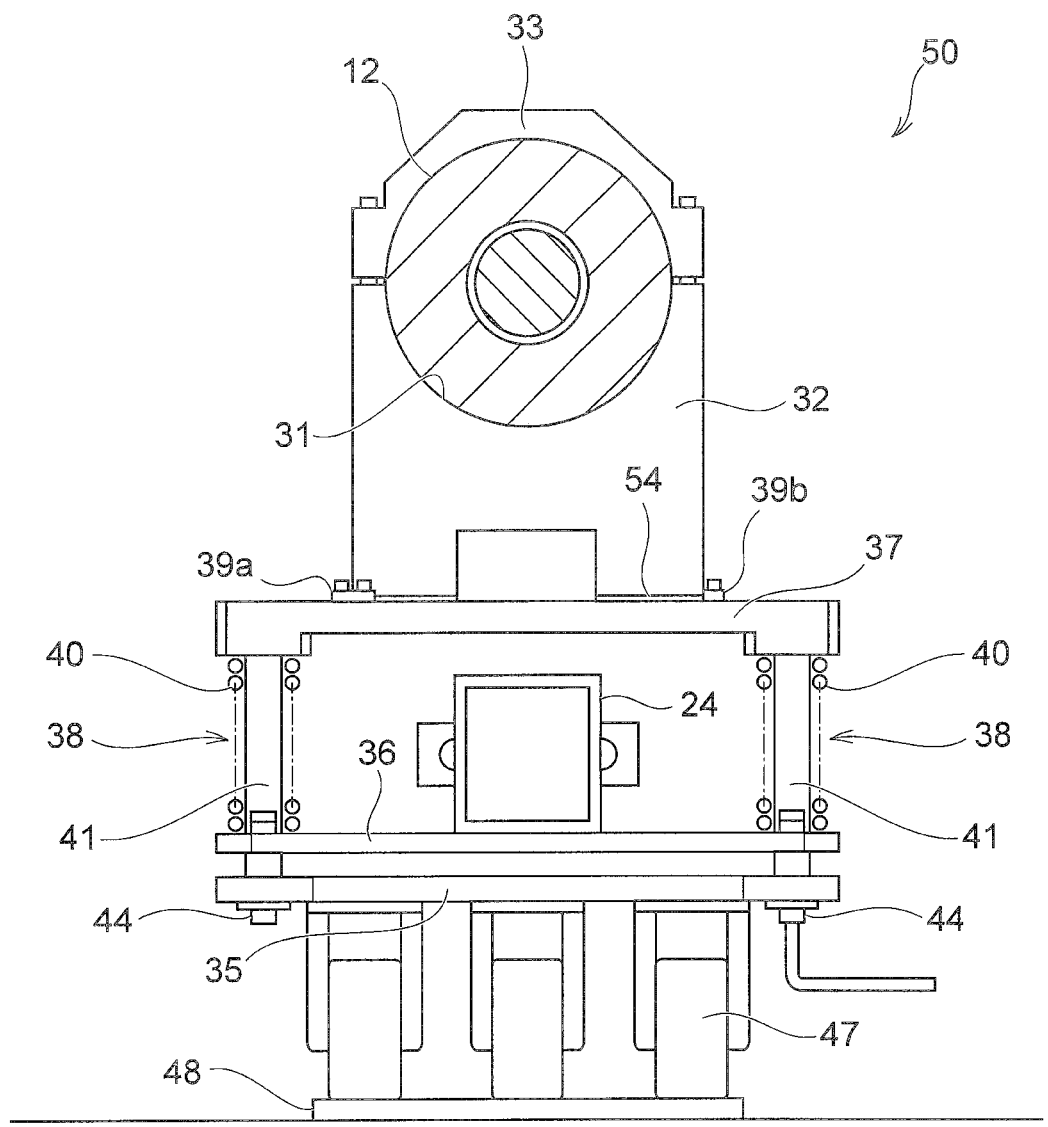
FIG. 4 is a front view of a barrel support apparatus according to the second embodiment.
Figure 5:
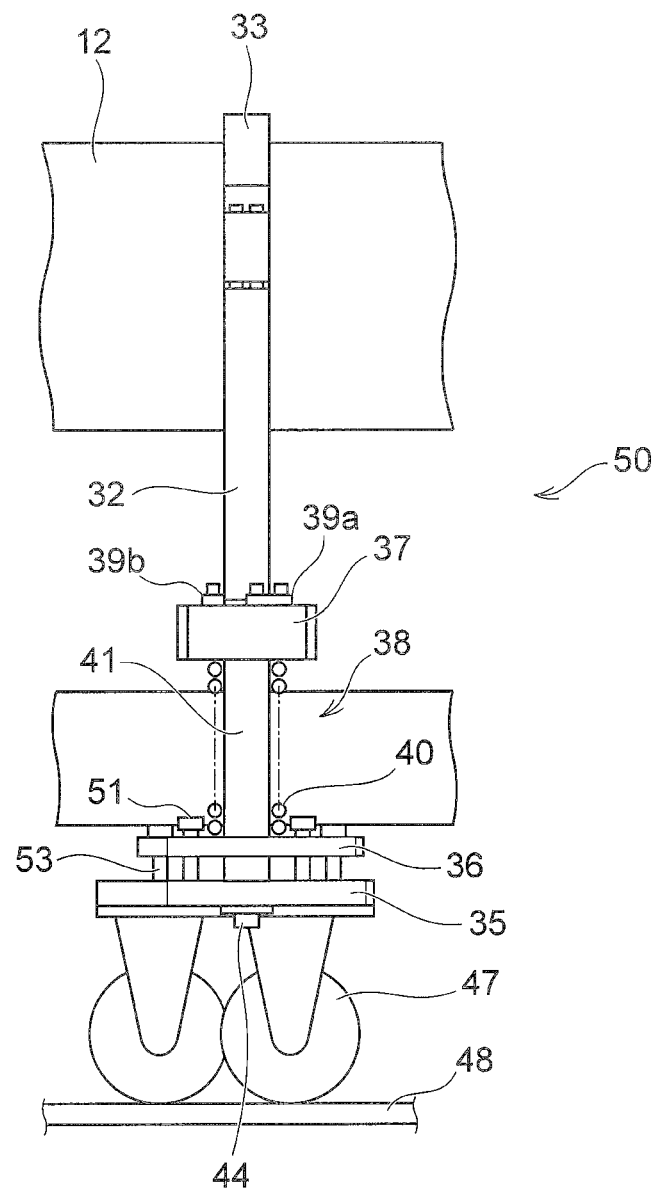
FIG. 5 is a side view of the barrel support apparatus according to the second embodiment.

FIG. 4 is a front view of the barrel support apparatus 50, and FIG. 5 is a side view of the barrel support apparatus 50. The barrel support apparatus 50 of this embodiment includes, as main components, a barrel support member 32 for supporting the barrel 12 from below, a support base 37 on which the barrel support member 32 is placed, and a leg portion 38 having a pair of spring structures for supporting the support base 37.

The barrel support member 32 is a plate-like member having a large semi-circular groove 31 formed in an upper portion. The lower surface of the horizontal barrel 12 detachably fits into the groove 31. A C-shaped clamp member 33 is mounted on the upper half of the barrel 12. The clamp member 33 is secured by bolts to the barrel support member 32. The barrel support member 32 is in a position perpendicular to the axial direction of the barrel 12. The barrel support member 32 is merely placed on the support base 37, and is not secured thereto e.g. by bolts. 39a and 39b denote stoppers for limiting the position of the barrel support member 32 in a horizontal (front-to-back/side-to-side) direction (not limiting the position in the vertical direction).

The leg portion 38 that supports the support base 37 will now be described. The support base 37 is supported horizontally by two coil springs 40. Each coil spring 40 concentrically fits on a spring shaft 41. The upper end of the spring shaft 41 is secured to the support base 37, while the lower end penetrates a movable plate 36 and reaches a fixed plate 35 located under the movable plate 36. Thus, the coil springs 40 are disposed between the support base 37 and the movable plate 36. The elastic force of the coil springs 40 pushes the support base 37 upward, so that the support base 37 can support the barrel 12 with the elastic force.

Figure 6:
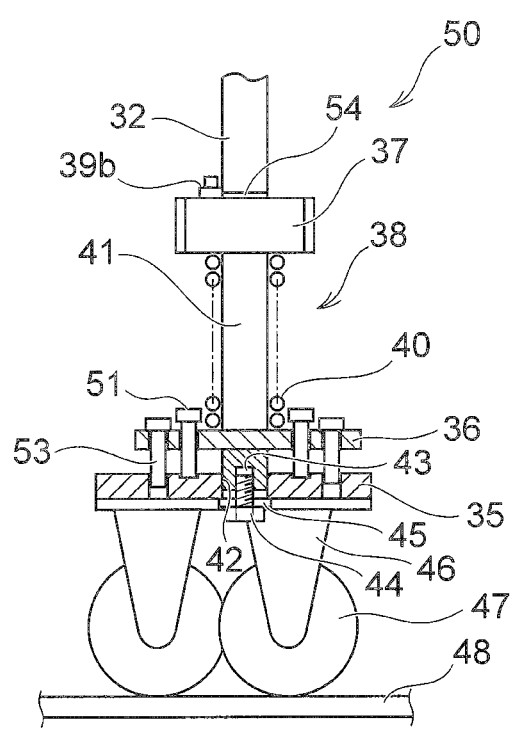
FIG. 6 is a partially cross-sectional side view of the barrel support apparatus supporting a barrel.

As shown in FIG. 6, a hole 42 is formed in the fixed plate 35. The lower end of the spring shaft 41 is inserted into the hole 42. A female thread 43 is formed in the lower surface of the spring shaft 41. A draw-in bolt 44 coaxially engages the female thread 43. The head of the draw-in bolt 44 is seated on a washer 45 which closes the hole 42.

Casters 47 are mounted via brackets 46 to the lower surface of the fixed plate 35. The casters 47 roll on a traveling platform 48.

In FIGS. 6, 51 and 53 denote height adjustment bolts for fine-adjusting the height of the support base 37.

The action and effect of the thus-constructed barrel support apparatus 50 according to the second embodiment will now be described.

As shown in FIG. 3, the barrel 12 is supported horizontally by the barrel support apparatus 50 during successive injection cycles. The barrel support apparatus 50, supporting the barrel 12, moves forward and backward following the movement of the barrel 12. The barrel 12 is not in fact a perfect rigid body which is hypothetically regarded as being free of any mechanical deformation; thus, it is impossible to completely avoid bending of the barrel 12 due to the action of a bending moment. However, since the barrel 12 is horizontally supported by the barrel support apparatus 50 in this embodiment, the bend of the barrel 12 can be effectively reduced. The barrel support apparatus 50 moves following the movement of the barrel 12, and therefore there is no change in the position of the support point on the barrel 12. Accordingly, there is no change in the state of the barrel 12 which is supported horizontally with reduced bending.

As shown in FIG. 6, in the barrel support apparatus 50, the self-weight of the barrel 12 is supported solely by the elastic force of the coil springs 40. The draw-in bolt 44 is in a loose state.

The lower end of the barrel support member 32 is preferably placed on the support base 37 via a heat insulating material 54. This can prevent conduction of the heat of the barrel 12 to the support base 37 and the coil springs 40, thereby preventing a height error due to a thermal displacement.

The action of the barrel support apparatus 50 at the start of pivoting of the barrel 12 will now be described with reference to FIGS. 7 and 8.

Figure 7:
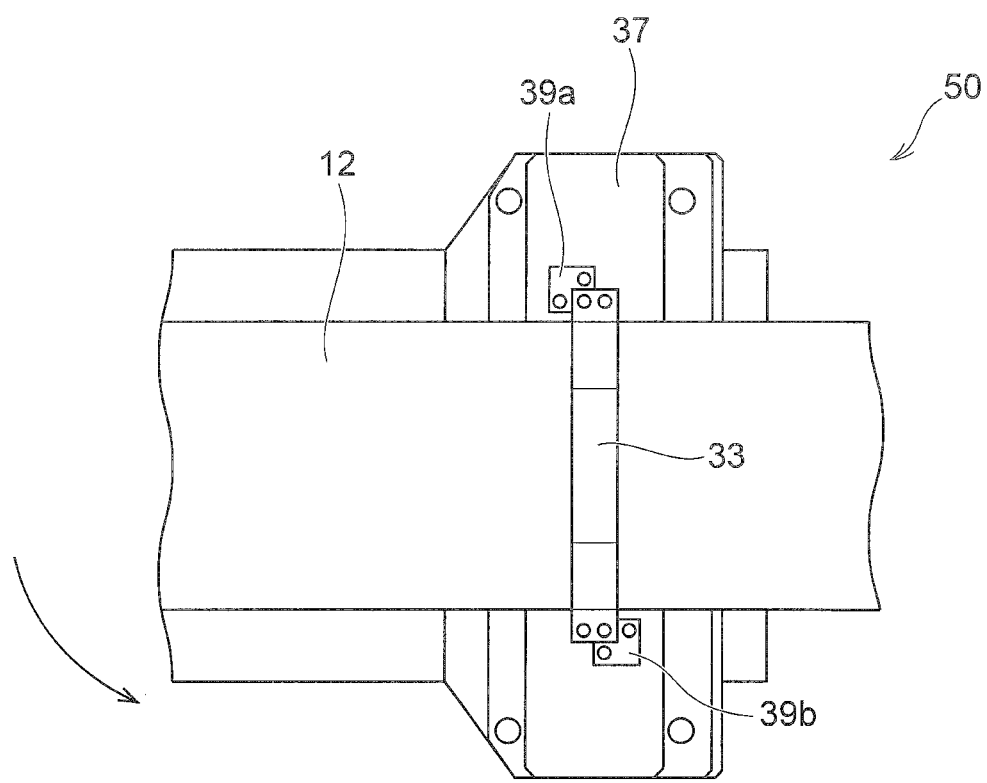
FIG. 7 is a plan view, as viewed from above, of the barrel support apparatus supporting a barrel.

FIG. 7 shows the barrel support apparatus 50 as viewed from above. The stoppers 39a, 39b on the support base 37 are each in contact with a corner of the barrel support member 32, inhibiting pivoting of the barrel 12. Therefore, if the barrel 12 is to be pivoted in the direction of the arrow, the stopper 39b is removed.

Figure 8A:
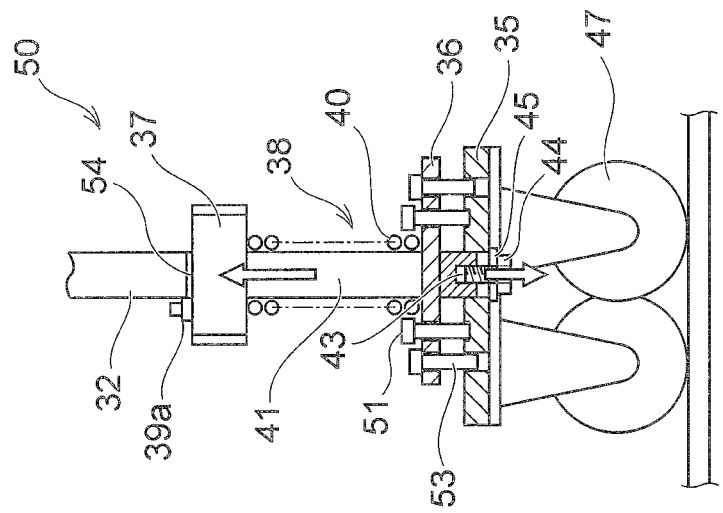
FIGS. 8A and 8B are diagrams illustrating a positional relationship between a barrel support member and a support base in comparison between when starting pivoting of a barrel (FIG. 8A) and when the barrel after maintenance is supported horizontally in its original position (FIG. 8B).
Figure 8B:
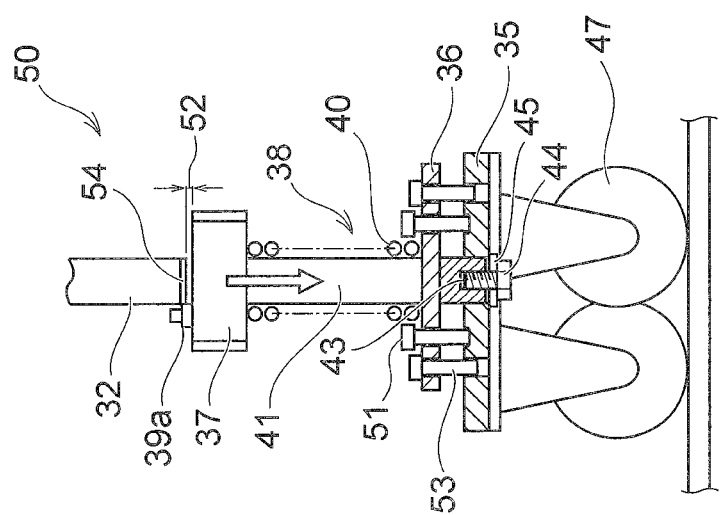

FIGS. 8A and 8B are diagrams illustrating a positional relationship between the barrel support member 32 and the support base 37 in comparison between when starting pivoting of the barrel 12 (FIG. 8A) and when the barrel 12 after maintenance is supported horizontally in its original position (FIG. 8B).

Referring to FIG. 8A, as the draw-in bolt 44 is rotated in the fastening direction using a tool such as a hex wrench, the coil springs 40 are compressed against the elastic force of the coil springs 40. Therefore, the position of the support base 37 can be lowered together with the spring shaft 41. Accordingly, a gap 52 is formed between the lower surface of the barrel support member 32 and the upper surface of the support base 37. Thus, the barrel support member 32 becomes detached from the support base 37. The barrel 12 can then be pivoted. The barrel support apparatus 50 according to the second embodiment can thus detach the barrel support member 32 from the support base 37, and therefore is not an obstacle that impedes pivoting movement of the barrel 12.

The action of the barrel support apparatus 50 upon return of the pivoted barrel 12 to the original supported state will now be described.

When the barrel 12 is pivoted and the barrel support member 32 reaches the support base 37, the gap 52 exists between the lower surface of the barrel support member 32 and the upper surface of the support base 37 as shown in FIG. 8A.

Then, as shown in FIG. 8B, as the draw-in bolt 44 is rotated in the loosening direction using a tool such as a hex wrench, the support base 37 is pressed by the elastic force of the coil springs 40 and rises gradually. The gap 52 eventually disappears, and the upper surface of the support base 37 comes into contact with the lower surface of the barrel support member 32. The rotation of the draw-in bolt 44 is not stopped at the time of contact between the support base 37 and the barrel support member 32; the loosening of the draw-in bolt 44 is continued until it becomes a state in which no force is applied thereto. It is when the draw-in bolt 44 is loosened into this state that the barrel 12 returns to the original state in which it is supported solely by the elastic force of the coil springs 40. Thereafter, the stoper 39b is attached to the support base 37 as shown in FIG. 7.

As described above, according to the second embodiment, the pivoted barrel 12 can be retuned to its original position simply by loosening the draw-in bolt 44 and without the need for readjustment of the height of the barrel 12. The height adjustment is basically unnecessary. However, if a fine adjustment of the height of the barrel 12 is necessary because of an error e.g. due to the influence of heat, the adjustment can be performed by fastening or loosening the adjustment bolts 51, 53.

While preferred embodiments of the barrel support apparatus and the injection apparatus according to the present invention have been described, these embodiments have been presented by way of example only, and are not intended to limit the scope of the present invention. Indeed, the novel apparatus, method and system described herein may be embodied in a variety of other forms; furthermore, various omissions, substitutions and changes in the form of the embodiments described herein may be made without departing from the spirit of the present invention. The accompanying claims and their equivalents are intended to cover such forms or modifications as would fall within the scope and spirit of the present invention.

The invention claimed is:

1. A barrel support apparatus for horizontally supporting a barrel of an injection apparatus which can move forward and backward, comprising:
    a barrel support member configured to support the barrel from below and being placed on a support base supported by a spring;
    a leg portion which supports the barrel support member and is configured to move following the forward and backward movement of the barrel; and
    a detachment means configured to detach the support base from the barrel support member, against the elastic force of the spring that supports the support base, wherein
    the detachment means is configured to move the support base downward from a first position to a second position below the first position in a vertical direction when the barrel starts to turn,
    the first position is a position at which the support base supports the barrel and at which an upper surface of the support base comes into contact with a lower surface of the barrel support member, and
    the second position is a position at which a gap is formed between the lower surface of the barrel support member and the upper surface of the support base as a result of compression of the spring.

2. The barrel support apparatus according to claim 1, wherein the leg portion comprises a coil spring disposed between the support base and a movable plate disposed under the support base, and a spring shaft on which the coil spring is coaxially mounted and which connects the support base and a fixed plate located below the movable plate, and wherein the detachment means comprises a draw-in bolt mounted to the fixed plate and which coaxially engages a thread at the lower end of the spring shaft.

3. The barrel support apparatus according to claim 2, wherein the movable plate and the fixed plate are connected by an adjustment bolt configured to perform fine adjustment of the height of the support base.

4. The barrel support apparatus according to claim 1, wherein a stopper for limiting horizontal movement of the barrel support member is provided on the upper surface of the support base.

5. An injection apparatus comprising: a barrel; and the barrel support apparatus according to claim 1, wherein the barrel is horizontally supported by the barrel support apparatus.

6. The barrel support apparatus according to claim 2, wherein a stopper for limiting horizontal movement of the barrel support member is provided on the upper surface of the support base.

7. An injection apparatus comprising: a barrel; and the barrel support apparatus according to claim 2, wherein the barrel is horizontally supported by the barrel support apparatus.

8. The barrel support apparatus according to claim 3, wherein a stopper for limiting horizontal movement of the barrel support member is provided on the upper surface of the support base.

9. An injection apparatus comprising: a barrel; and the barrel support apparatus according to claim 3, wherein the barrel is horizontally supported by the barrel support apparatus.

10. An injection apparatus comprising: a barrel; and the barrel support apparatus according to claim 1, wherein the barrel is horizontally supported by the barrel support apparatus.

* * * * *